(12) United States Patent
Doster

(10) Patent No.: US 12,312,867 B2
(45) Date of Patent: May 27, 2025

(54) CUTTING ELEMENT WITH IMPROVED MECHANICAL EFFICIENCY

(71) Applicant: Baker Hughes Oilfield Operations LLC, Houston, TX (US)

(72) Inventor: Michael L. Doster, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 0 days.

(21) Appl. No.: 17/310,250

(22) PCT Filed: Feb. 5, 2020

(86) PCT No.: PCT/US2020/016839
§ 371 (c)(1),
(2) Date: Jul. 27, 2021

(87) PCT Pub. No.: WO2021/158218
PCT Pub. Date: Aug. 12, 2021

(65) Prior Publication Data
US 2022/0316280 A1 Oct. 6, 2022

(51) Int. Cl.
*E21B 10/567* (2006.01)
(52) U.S. Cl.
CPC ................ *E21B 10/5673* (2013.01)
(58) Field of Classification Search
CPC ... E21B 10/5673; E21B 10/567; E21B 10/573
See application file for complete search history.

(56) References Cited

U.S. PATENT DOCUMENTS

| 4,109,737 A | 8/1978 | Bovenkerk |
| 4,529,048 A | 7/1985 | Hall |

(Continued)

FOREIGN PATENT DOCUMENTS

| CN | 205778558 U | 12/2016 |
| EP | 0841463 B1 | 3/2004 |

(Continued)

OTHER PUBLICATIONS

International Search Report for International Application No. PCT/US2020/016839 dated Apr. 14, 2020, 2 pages.

(Continued)

*Primary Examiner* — Yanick A Akaragwe
(74) *Attorney, Agent, or Firm* — Baker Hughes Company

(57) ABSTRACT

A downhole tool comprising a bit body and a plurality of blades. Each blade having at least one cutting element disposed within the blade. Each cutting element comprising a substrate and a poly crystalline diamond material affixed to the substrate at an interface. The poly crystalline diamond material comprising a raised cutting surface comprising at least two cutting edges, a recess in a center of the raised cutting surface, and transition surfaces between the at least two cutting edges of the raised cutting surface and a side surface of the cutting element. The disclosure also includes a method of manufacturing a downhole tool comprising: forming a drill bit, blades, and cutting elements. Forming the cutting elements comprises forming a raised cutting surface comprising at least two cutting edges, forming a recess in a center of the raised cutting surface and forming transition surfaces between the raised cutting surface and a side surface of the cutting element.

16 Claims, 12 Drawing Sheets

(56) References Cited

U.S. PATENT DOCUMENTS

| | | |
|---|---|---|
| 4,570,726 A | 2/1986 | Hall |
| 4,593,777 A | 6/1986 | Barr |
| 4,872,520 A | 10/1989 | Nelson |
| 5,333,699 A | 8/1994 | Thigpen et al. |
| 5,377,773 A | 1/1995 | Tibbitts |
| 5,437,343 A | 8/1995 | Cooley et al. |
| 5,467,836 A | 11/1995 | Grimes et al. |
| 5,499,688 A | 3/1996 | Dennis |
| 5,871,060 A | 2/1999 | Jensen et al. |
| 5,881,830 A | 3/1999 | Cooley |
| 6,045,440 A | 4/2000 | Johnson et al. |
| 6,065,554 A | 5/2000 | Taylor et al. |
| 6,196,340 B1 | 3/2001 | Jensen et al. |
| 6,202,770 B1 | 3/2001 | Tibbitts |
| 6,244,365 B1 | 6/2001 | Southland |
| 6,447,560 B2 * | 9/2002 | Jensen ................. B22F 7/06 51/293 |
| 6,481,952 B2 | 11/2002 | Deutshle et al. |
| 6,510,910 B2 | 1/2003 | Eyre et al. |
| 6,513,608 B2 | 2/2003 | Eyre et al. |
| 6,550,556 B2 | 4/2003 | Middlemiss et al. |
| 7,363,992 B2 | 4/2008 | Stowe et al. |
| 7,726,420 B2 | 6/2010 | Shen et al. |
| 7,757,785 B2 | 7/2010 | Zhang et al. |
| 7,798,257 B2 | 9/2010 | Shen et al. |
| 8,037,951 B2 | 10/2011 | Shen et al. |
| 8,113,303 B2 | 2/2012 | Zhang et al. |
| 8,191,656 B2 | 6/2012 | Dourfaye et al. |
| 8,360,175 B2 | 1/2013 | Fan et al. |
| 8,783,387 B2 | 7/2014 | Durairajan et al. |
| 8,833,492 B2 | 9/2014 | Durairajan et al. |
| 8,936,109 B2 * | 1/2015 | Stowe ................. E21B 10/54 175/428 |
| RE45,748 E | 10/2015 | Zhang et al. |
| 9,441,422 B2 | 9/2016 | DiSantis |
| 9,598,909 B2 | 3/2017 | Patel |
| 9,650,837 B2 | 5/2017 | Patel et al. |
| 10,022,840 B1 * | 7/2018 | Miess ................. E21B 10/567 |
| 10,125,552 B2 | 11/2018 | Zhao et al. |
| 10,240,399 B2 | 3/2019 | Rahmani |
| 10,287,825 B2 | 5/2019 | Chen et al. |
| 10,309,156 B2 | 6/2019 | Azar et al. |
| 10,378,289 B2 | 8/2019 | Stockey |
| 10,550,644 B2 | 2/2020 | Drews et al. |
| 10,570,668 B2 | 2/2020 | Izbinski et al. |
| 10,605,010 B2 | 3/2020 | De Maindreville et al. |
| 10,753,157 B2 | 8/2020 | Rahmani |
| 10,794,118 B2 | 10/2020 | Azar et al. |
| 10,801,268 B2 | 10/2020 | Rahmani et al. |
| 10,907,416 B2 | 2/2021 | Cheng et al. |
| 11,035,177 B2 | 6/2021 | Dubose et al. |
| 11,060,356 B2 | 7/2021 | Cuillier De Maindreville et al. |
| 11,091,960 B2 | 8/2021 | Zhang et al. |
| 11,098,532 B2 | 8/2021 | Gan et al. |
| 11,208,849 B2 | 12/2021 | Rahmani et al. |
| 11,255,129 B2 | 2/2022 | Dubose et al. |
| 2001/0030063 A1 | 10/2001 | Dykstra et al. |
| 2002/0108791 A1 | 8/2002 | Eyre et al. |
| 2003/0158018 A1 | 8/2003 | Giannelli et al. |
| 2004/0097532 A1 | 5/2004 | Jesudason et al. |
| 2004/0163851 A1 | 8/2004 | Mcdonough et al. |
| 2005/0269139 A1 | 12/2005 | Shen et al. |
| 2006/0210364 A1 | 9/2006 | Bellmann et al. |
| 2008/0190666 A1 | 8/2008 | Gatell |
| 2010/0059287 A1 | 3/2010 | Durairajan et al. |
| 2010/0300765 A1 | 12/2010 | Zhang et al. |
| 2011/0031030 A1 | 2/2011 | Shen et al. |
| 2011/0266070 A1 | 11/2011 | Scott et al. |
| 2013/0068534 A1 * | 3/2013 | DiGiovanni ........ E21B 10/5673 175/428 |
| 2013/0306377 A1 | 11/2013 | Digiovanni et al. |
| 2016/0069140 A1 | 3/2016 | Patel et al. |
| 2017/0037518 A1 | 2/2017 | Oxford et al. |
| 2017/0234078 A1 | 8/2017 | Patel et al. |
| 2018/0148978 A1 | 5/2018 | Chen |
| 2018/0274303 A1 | 9/2018 | Song et al. |
| 2018/0320450 A1 | 11/2018 | Borge |
| 2018/0355672 A1 | 12/2018 | De Maindreville et al. |
| 2019/0040689 A1 | 2/2019 | Liang et al. |
| 2019/0084087 A1 * | 3/2019 | Chapman ............. B24D 99/005 |
| 2019/0106943 A1 * | 4/2019 | Tilleman ............. E21B 10/5673 |
| 2019/0112877 A1 * | 4/2019 | Gan ................. E21B 10/54 |
| 2020/0157890 A1 | 5/2020 | Cuillier et al. |
| 2020/0347680 A1 | 11/2020 | Tian et al. |
| 2021/0131190 A1 | 5/2021 | Rahmani et al. |
| 2021/0156202 A1 | 5/2021 | Gan et al. |
| 2021/0164296 A1 | 6/2021 | Zhao et al. |
| 2021/0172258 A1 | 6/2021 | Graham et al. |
| 2021/0180409 A1 | 6/2021 | Davila et al. |
| 2021/0215003 A1 | 7/2021 | Mahajan et al. |
| 2021/0277722 A1 * | 9/2021 | Liu ................. E21B 10/5673 |
| 2021/0370419 A1 | 12/2021 | Yu et al. |
| 2021/0372203 A1 | 12/2021 | Eyre et al. |
| 2021/0381318 A1 | 12/2021 | Gan et al. |
| 2022/0003046 A1 | 1/2022 | Yu et al. |
| 2022/0074271 A1 | 3/2022 | Rahmani et al. |
| 2022/0112773 A1 | 4/2022 | Chen et al. |

FOREIGN PATENT DOCUMENTS

| | | |
|---|---|---|
| GB | 2339221 A | 1/2000 |
| KR | 10-2015-0096542 A | 8/2015 |
| WO | 2017/172431 A2 | 10/2017 |
| WO | 2018/231343 A1 | 12/2018 |
| WO | 2020/102016 A1 | 5/2020 |
| WO | 2020/131421 | 6/2020 |
| WO | 2020/245165 A1 | 12/2020 |
| WO | 2020/245223 A1 | 12/2020 |
| WO | 2021/041753 A1 | 3/2021 |
| WO | 2021/080900 A1 | 4/2021 |
| WO | 2021/091836 A1 | 5/2021 |
| WO | 2021/142188 A | 7/2021 |
| WO | 2021/178304 A1 | 10/2021 |
| WO | 2021/243361 A1 | 12/2021 |
| WO | 2021/243362 A1 | 12/2021 |

OTHER PUBLICATIONS

International Written Opinion for International Application No. PCT/US2020/016839 dated Apr. 14, 2020, 5 pages.
International Search Report for International Application No. PCT/US2022/072947 dated October 1'4, 2022, 3 pages.
International Written Opinion for International Application No. PCT/US2022/072947 dated Oct. 14, 2022, 4 pages.
International Search Report for International Application No. PCT/US20/16826, mailed Apr. 14, 2020, 2 pages.
International Search Report for International Application No. PCT/US2020/016826 dated Apr. 14, 2020, 2 pages.
International Written Opinion for International Application No. PCT/US20/16826, mailed Apr. 14, 2020, 5 pages.
International Written Opinion for International Application No. PCT/US2020/016826 dated Apr. 14, 2020, 5 pages.
European Extended Search Report and Opinion for European Application No. 20917982.9, dated Sep. 18, 2023, 7 pages.
Liu et al., Chinese Patent No., CN-205778558-U, Dec. 2016, English Translation dated Nov. 16, 2023. (Year: 2016).
European Communication pursuant to Article 94(3) EPC for European Application No. 20917718.7, dated Jul. 23, 2024, 4 pages.

* cited by examiner

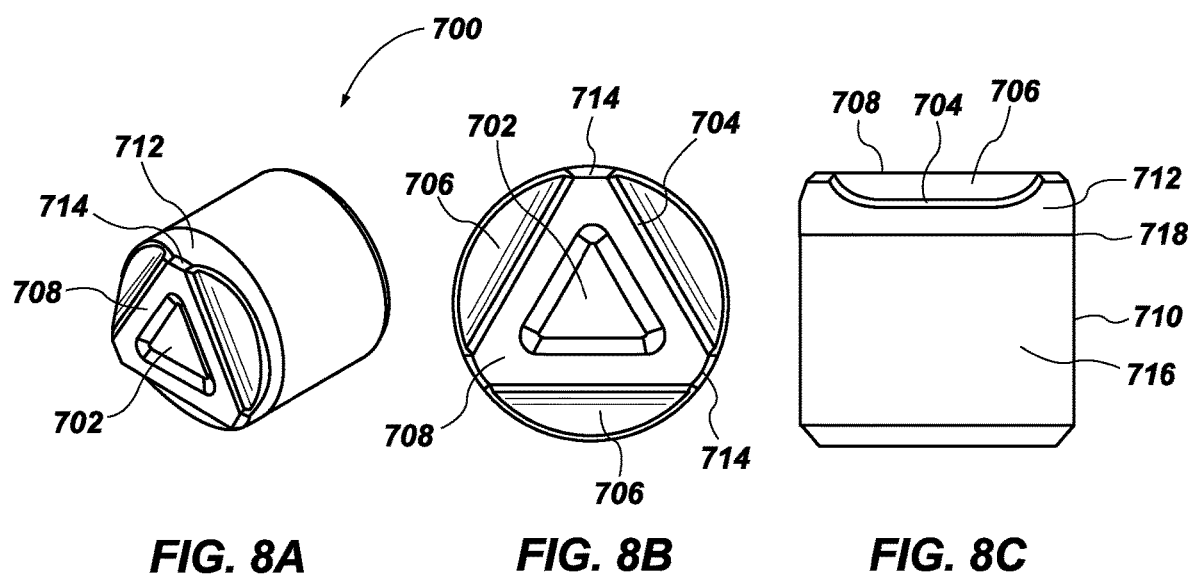

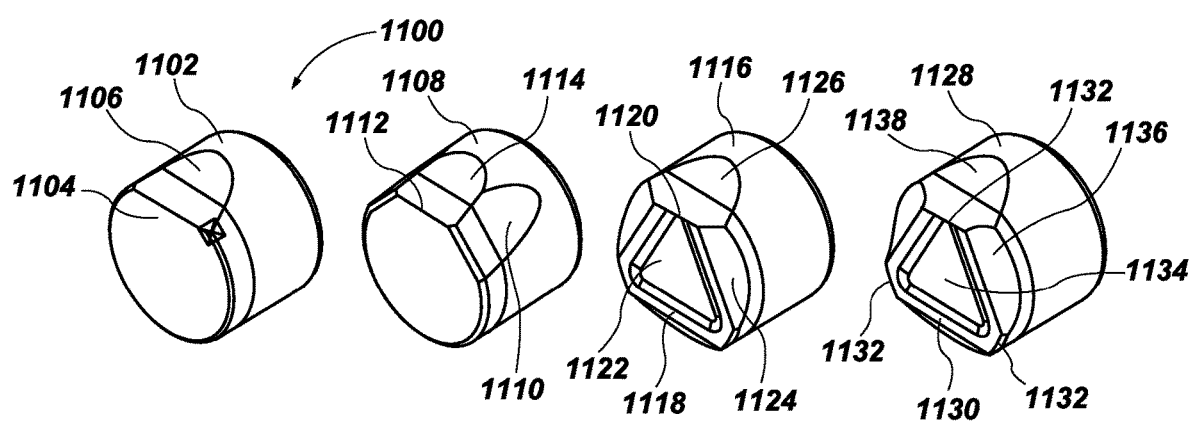
*FIG. 12A*   *FIG. 12B*   *FIG. 12C*   *FIG. 12D*

CUTTING ELEMENT WITH IMPROVED MECHANICAL EFFICIENCY

CROSS-REFERENCE TO RELATED APPLICATIONS

This application is a national phase entry under 35 U.S.C. § 371 of International Patent Application PCT/US/2020/016839, filed Feb. 5, 2020, designating the United States of America, the disclosure of which is hereby incorporated herein in its entirety by this reference.

TECHNICAL FIELD

Embodiments of the present disclosure generally relate to cutting elements for use on earth-boring tools during earth-boring operations. In particular, embodiments of the present disclosure relate to cutting elements having geometries for improved mechanical efficiency.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using earth boring tools, such as an earth-boring rotary drill bit 10, as shown in FIG. 1. The earth-boring tool 10 comprises a bit body 50 and a plurality of blades 30 extending from one end of the bit body 50. Each of the blades comprises a leading edge section 40; and at least one cutting element 20 disposed within each blade proximate the leading edge. The earth-boring rotary drill bit 10 is rotated and advanced into the subterranean formation. As the earth-boring rotary drill bit 10 rotates, the cutters 20 or abrasive structures thereof cut, crush, shear, and/or abrade away the formation material to form the wellbore.

The earth-boring rotary drill bit 10 is coupled, either directly or indirectly, to an end of what is referred to in the art as a "drill string," which comprises a series of elongated tubular segments connected end-to-end that extends into the wellbore from the surface of earth above the subterranean formations being drilled. Various tools and components, including the drill bit 10, may be coupled together at the distal end of the drill string at the bottom of the wellbore being drilled. This assembly of tools and components is referred to in the art as a "bottom-hole assembly" (BHA).

The earth-boring rotary drill bit 10 may be rotated within the wellbore by rotating the drill string from the surface of the formation, or the drill bit 10 may be rotated by coupling the drill bit 10 to a downhole motor, which is coupled to the drill string and disposed proximate the bottom of the wellbore. The downhole motor may include, for example, a hydraulic Moineau-type motor having a shaft, to which the earth-boring rotary drill bit is mounted, that may be caused to rotate by pumping fluid (e.g., drilling mud or fluid) from the surface of the formation down through the center of the drill string, through the hydraulic motor, out from nozzles in the drill bit 10, and back up to the surface of the formation through the annular space between the outer surface of the drill string and the exposed surface of the formation within the wellbore. The downhole motor may be operated with or without drill string rotation.

Different types of earth-boring rotary drill bits 10 are known in the art, including fixed-cutter bits like that shown in FIG. 1, rolling-cutter bits, and hybrid bits (which may include, for example, both fixed cutters and rolling cutters). Fixed-cutter bits, as opposed to roller cone bits, have no moving parts and are designed to be rotated about the longitudinal axis of the drill string. Most fixed-cutter bits employ Polycrystalline Diamond Compact (PDC) cutting elements 20. The cutting edge of a PDC cutting element 20 drills rock formations by shearing, like the cutting action of a lathe, as opposed to roller cone bits that drill by indenting and crushing the rock. The cutting action of the cutting edge plays a major role in the amount of energy needed to drill a rock formation.

A PDC cutting element 20 is usually composed of a thin layer, (about 3.5 mm), of polycrystalline diamond bonded to a cutting element substrate at an interface. The polycrystalline diamond material is often referred to as the "diamond table." A PDC cutting element 20 is generally cylindrical with a diameter from about 8 mm up to about 24 mm. However, PDC cutting elements may be available in other forms such as oval or triangle-shapes and may be larger or smaller than the sizes stated above.

A PDC cutting element 20 may be fabricated separately from the bit body and secured within cutting element pockets formed in the outer surface of a blade of the bit body. A bonding material such as an adhesive or, more typically, a braze alloy may be used to secure the PDC cutting element within the pocket. The diamond table of a PDC cutting element is formed by sintering and bonding together relatively small diamond grains under conditions of high temperature and high pressure (HTHP) in the presence of a catalyst (such as, for example, cobalt, iron, nickel, or alloys and mixtures thereof) to form a layer or "table" of polycrystalline diamond material on the cutting element substrate.

FIGS. 2A, 2B, and 2C illustrate perspective, face, and side views respectively of a prior art conventional Polycrystalline Diamond Compact (PDC) cutting element 100. The polycrystalline diamond table (diamond table) 104 is bonded to the substrate 106 at an interface 110. Before being used, a PDC cutting element typically has a planar front cutting face 108 and a conventional cylindrical cutting edge 102. The planar front cutting face 108 is perpendicular to a longitudinal axis 112 of the cutting element 100 and generally parallel to the interface 110 between the diamond cutting table 104 and the substrate 106. The cutting edge 102 of the PDC cutting element 100 is where the planar front cutting face 108 meets the longitudinal side surface of the of the diamond table 104. The cutting edge 102 of a PDC cutting element 100 drills rock formations by shearing the formation material (like the cutting action of a lathe). The cutting action of the cutting edge 102 plays a major role in the amount of energy needed to drill a rock formation. During use, as the cutting edge 102 of the PDC cutting element 100 abrades, a wear scar develops at the cutting edge 102. Eventually, the cutting edge 102 in contact with the formation becomes linear as the wear scar forms and develops. A wear scar 1106 for a conventional PDC cutting element 1102 is illustrated in FIG. 12A.

The cutting element substrate 106 may comprise a cermet material (i.e., a ceramic metal composite material) such as, for example, cobalt cemented tungsten carbide. In such instances, the cobalt (or other catalyst material) in the substrate 106 may be swept into the diamond grains during sintering and serve as the catalyst material for forming the inter-granular diamond-to-diamond bonds between the diamond grains in the diamond table 104.

Upon formation of a diamond table using the HTHP process, catalyst material may remain in interstitial spaces between the grains of the diamond table. The presence of the catalyst material in the diamond table may contribute to degradation in the diamond-to-diamond bonds between the diamond grains in diamond table when the cutting element 100 gets hot during use. Degradation of the diamond-to-diamond bonds due to heat is referred to as "thermal damage" to the diamond table 104. Therefore, it is advantageous to minimize the amount heat that a cutting element 100 is exposed to. This may be accomplished by reducing the rate of penetration of the earth-boring rotary drill bit. However, reduced rate of penetration, means longer drilling time and more costs associated with drilling while cutting element 100 failure means stopping the drilling process to remove the drill string in order to replace the drill bit. Thus, there is a need for cutting elements with improved rates of penetration and improved durability while the heat build-up at the cutting element is reduced.

One method to enhance the durability of a PDC cutting element is modify the cutting edge of the PDC cutting element to reduce stress points. One way to do this is to form tapered surfaces into the cylindrical side surface of the cutting element as illustrated in FIGS. 3A, 3B, and 3C. FIGS. 3A, 3B, and 3C illustrate perspective, face and side views of a prior art PDC cutting element 200. The PDC cutting element 200 comprises a polycrystalline diamond table 204 and a substrate 206 bonded together at an interface 214. It is known in the industry to form planar tapered surfaces 202 into the side surface of the PDC cutting element 200 adjacent to the cutting face 212 and cutting edge 208 of the cutting element 200.

Another method to improve the efficiency and durability of cutting element 200 is to form chamfered edges 210 on the cutting edge 208 of the diamond table 204. It is known in the industry to chamfer edges of a PDC cutting element 200 to enhance the durability of the PDC cutting element 200. Diamond tables 204 with chamfered edges 210 on the cutting edge 208 have been found to have a reduced the tendency to spall and fracture.

Multi-chamfered Polycrystalline Diamond Compact (PDC) cutting elements are also known in the art. For example, a multi-chamfered cutting element is taught by Cooley et al., U.S. Pat. No. 5,437,343, assigned to the assignee of the present invention. In particular, the Cooley et al. patent discloses a PDC cutting element having a polycrystalline diamond material having two concentric chamfers.

It is also known in the industry to modify the shape of the diamond table to improve cutting element efficiency and durability. U.S. Pat. No. 5,333,699 to Thigpin et al. is directed to a cutting element having a spherical first end opposite the cutting end. Cutting element variations, illustrated in FIGS. 22-29 of Thigpin et al., comprise channels or holes formed in the cutting face. U.S. Pat. No. 9,598,909 to Patel is directed to cutting elements with grooves on the cutting face as illustrated in FIGS. 9-13 of Patel.

U.S. Pat. No. 4,109,737 to Bovenkerk is directed toward cutting elements having a thin layer of polycrystalline diamond bonded to a free end of an elongated pin. One particular cutting element variation illustrated in FIG. 4G of Bovenkerk, comprises a generally hemispherical diamond layer having a plurality of flats formed on the outer surface thereof.

U.S. Pat. No. 10,378,289 to Stockey and U.S. Patent Publication U.S. 2017/0234078 A1 to Patel et al. are directed towards a cutting face of a cutting element having multiple chamfers forming concentric rings on the cutting face. One particular cutting element variation, illustrated in FIG. 1 of Stockey, comprises a ring surface with a chamfer at the cutting edge surrounding an annular recess which in turn surrounds planar circle at the center of the cutting face. Another cutting element variation illustrated in FIG. 2 of Patel et al, comprises multiple raised ring surfaces and multiple annular recesses surrounding a planar circle at the center of the cutting face.

U.S. Pat. No. 6,196,340 to Jensen is directed to raised surface geometries on non-planar cutting elements. One variation, illustrated in FIG. 4a of Jensen, comprises a four-sided pyramidal shape with a planar square surface at the top.

U.S. Patent Publication 2018/0148978 A1 to Chen is directed toward a cutting element with a raised hexagonal shape. Another cutting element variation, illustrated in FIG. 5A of Chen, comprises a raised hexagonal shape having chamfered edges. Another cutting element variation, illustrated in FIG. 5C of Chen, comprises a raised cutting surface having six round "teeth."

U.S. Pat. No. 8,783,387 to Durairajan et al. is directed to cutting elements having geometries for high Rate of Penetration (ROP). One cutting element variation, illustrated in FIGS. 4 and 5 of Durairajan et al., comprises a cutting element having a shaped cutting surface comprising a raised triangular shape. Another cutting element variation, illustrated in FIGS. 5 and 6, of Durairajan et al., comprises a cutting element with a raised triangle having a beveled or chamfered edge.

PCT Publication WO 2018/231343 to Cuillier De Maindreville et al. is directed to superabrasive bits with multiple raised cutting surfaces. One cutting element variation, illustrated in FIG. 1, of Cuillier De Maindreville et al., comprises raised triangular shapes similar to Durairajan et al.

U.S. Pat. No. 5,499,688 to Dennis is directed to PDC cutting elements. Cutting element variations, illustrated in FIGS. 7-11 of Dennis, comprise cutting elements with various raised shapes including triangular and hexagonal shapes.

Cutting elements with raised surfaces and chamfered edges are known in the industry. However, these innovations have not addressed thermal issues related to cutting elements and a need still exists for further improvements in reliability and durability of cutting elements.

BRIEF SUMMARY

In some embodiments, the present disclosure includes a cutting element for an earth-boring tool for forming a borehole through a subterranean formation. The cutting element comprises a substrate and a polycrystalline diamond material affixed to the substrate at an interface. The polycrystalline diamond material comprises a raised cutting surface having two cutting edges, a recess in the center of the raised cutting surface; and a transition surface between the two cutting edges of the raised cutting surface and a longitudinal side surface of the cutting element.

In some embodiments, the present disclosure includes an earth-boring downhole tool for forming a borehole through a subterranean formation. The earth-boring tool comprises a bit body and a plurality of blades extending from one end of the body. Each of the blades comprises a leading edge section; and at least one cutting element disposed within each blade proximate the leading edge section of the blade. The at least one cutting element comprises a substrate and a poly crystalline diamond material affixed to the substrate at an interface. The polycrystalline diamond material comprises a raised cutting surface having three cutting edges, a recess in a center of the raised cutting surface, and a transition surface between the three cutting edges of the raised cutting surface and a longitudinal side surface of the cutting element.

In some embodiments, the present disclosure includes a method of manufacturing an earth-boring tool for forming a borehole through a subterranean formation. The method comprises forming at least one blade extending from one end of an earth-boring rotary drill bit body wherein the at least one blade comprises a leading edge section. The method further comprises forming at least one cutting element in at least one blade proximate the leading edge section of the blade. Wherein, forming the at least one cutting element comprises; forming a polycrystalline diamond material, affixing a first end of the polycrystalline diamond material at an interface to a substrate, and shaping a second end of the polycrystalline diamond material. Wherein shaping the second end of the polycrystalline diamond material comprises; forming at least two cutting edges defining a raised cutting surface, forming at least one recess in a center of the raised cutting surface, and forming at least one transition surface between at least one of the at least two cutting edges defining the raised cutting surface and a longitudinal side surface of the cutting element.

BRIEF DESCRIPTION OF THE DRAWINGS

FIGS. 8A through 8C illustrate a PDC cutting element, in accordance with one embodiment, having a raised cutting surface comprising three cutting edges, a recess in the center of the raised cutting surface, and concave transition surfaces; wherein at least one of the cutting edges is chamfered.

FIG. 1I is a graph depicting tangential load (or torque) over time on a prior art conventional cylindrical cutting element and a cutting element, in accordance with one embodiment, having a raised cutting surface comprising three cutting edges and a recess in the center of the raised cutting surface, FIGS. 12A through 12D illustrate a wear state comparison of a prior art conventional cylindrical cutting element, a prior art cutting element having planar tapered surfaces, a cutting element, in accordance with one embodiment, having a raised cutting surface comprising three cutting edges, a recess in the center of the raised cutting surface, and planar surfaces, and a cutting element, in accordance with one embodiment, having a raised cutting surface comprising three cutting edges, a recess in the center of the raised cutting surface, and concave surfaces.

DETAILED DESCRIPTION

Figure 1:
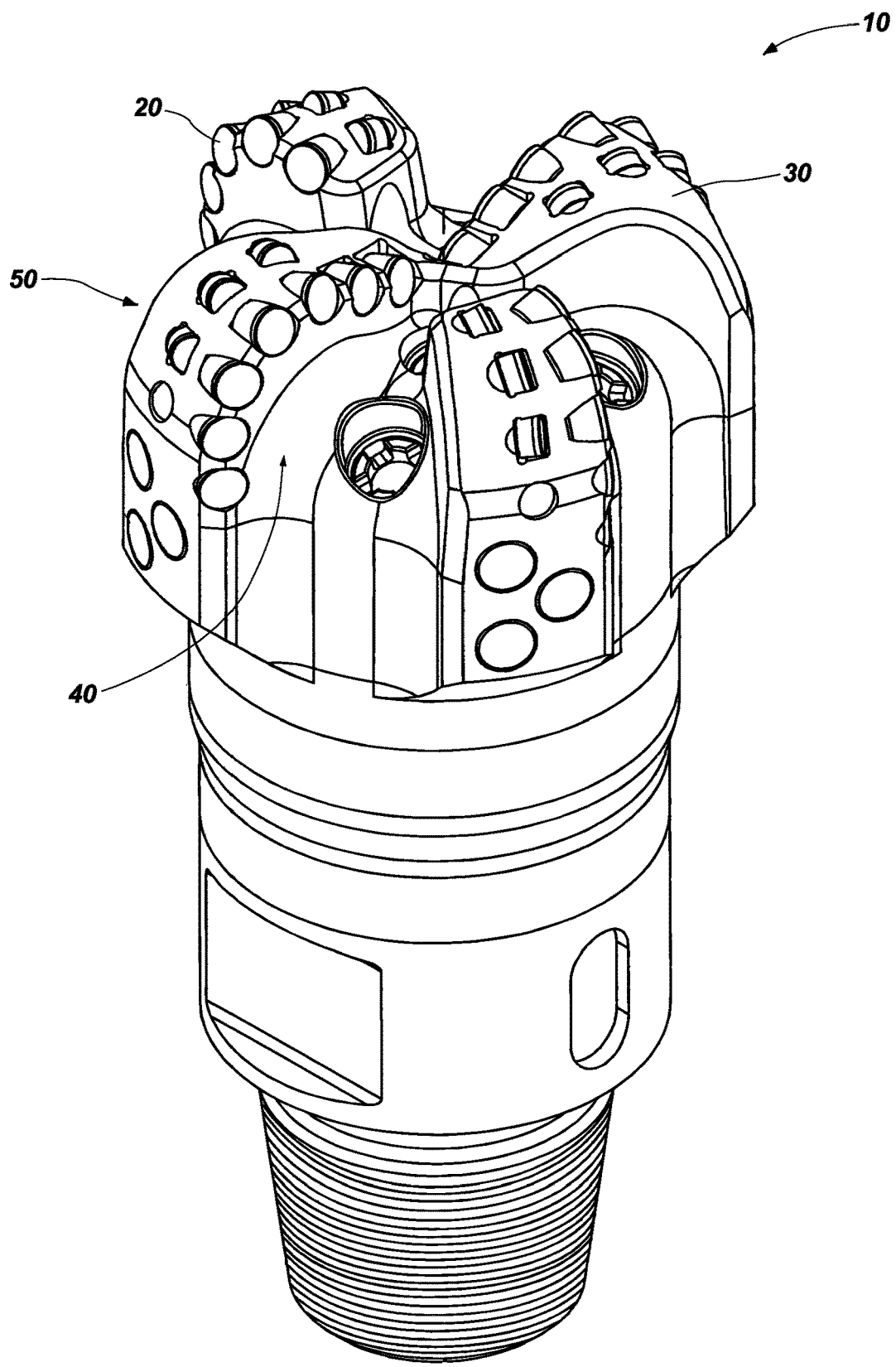
FIG. 1 illustrates a prior art earth-boring rotary drill bit.
Figures 2A, 2B, 2C:
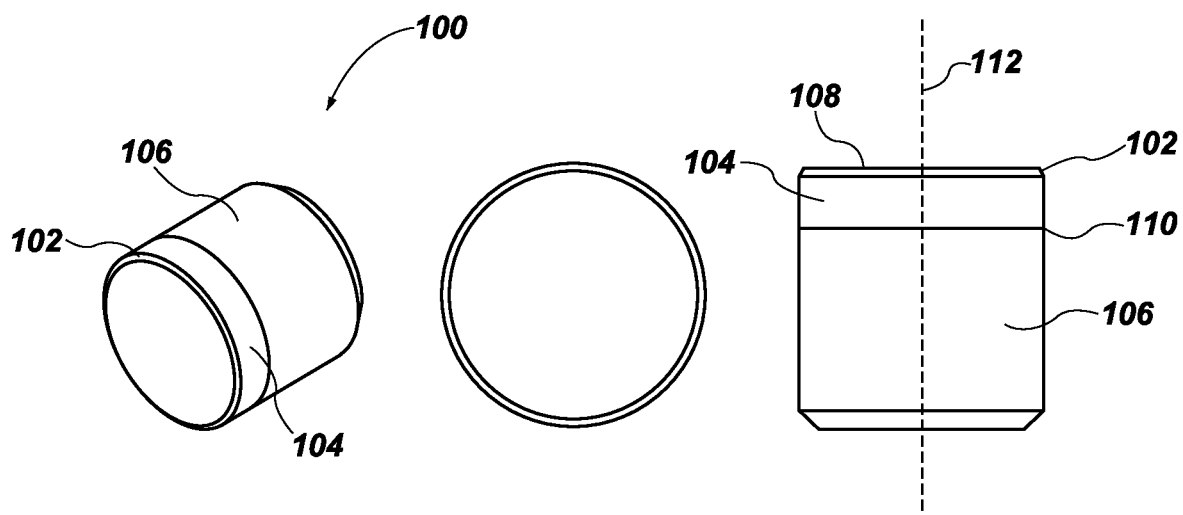
FIGS. 2A through 2C illustrate a prior art conventional cylindrical PDC cutting element having a conventional cylindrical planar front cutting face.
Figures 3A, 3B, 3C:
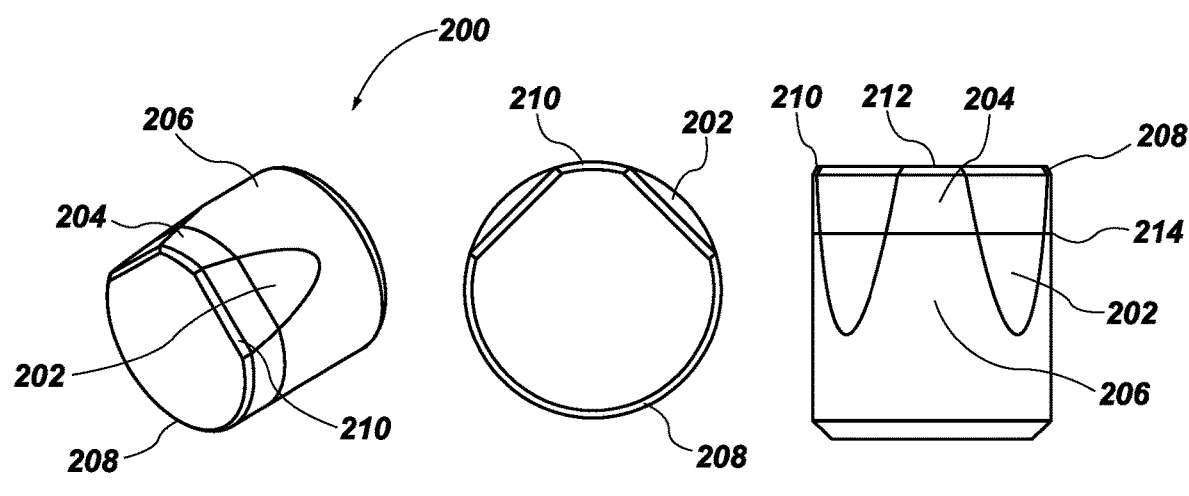
FIGS. 3A through 3C illustrate a prior art PDC cutting element having two planar, tapered surfaces formed into the cylindrical side surface of the cutting element adjacent to the cutting face of the cutting element.

The illustrations presented herein are not actual views of any particular cutting assembly, tool, or drill string, but are merely idealized representations employed to describe example embodiments of the present disclosure. The following description provides specific details of embodiments of the present disclosure in order to provide a thorough description thereof. However, a person of ordinary skill in the art will understand that the embodiments of the disclosure may be practiced without employing many such specific details. Indeed, the embodiments of the disclosure may be practiced in conjunction with conventional techniques employed in the industry. In addition, the description provided below does not include all elements to form a complete structure or assembly. Only those process acts and structures necessary to understand the embodiments of the disclosure are described in detail below. Additional conventional acts and structures may be used. The drawings accompanying the application are for illustrative purposes only, and are not drawn to scale. Additionally, elements common between figures may have corresponding numerical designations.

As used herein, the terms "comprising," "including," "containing," "characterized by," and grammatical equivalents thereof are inclusive or open-ended terms that do not exclude additional, unrecited elements or method steps, but also include the more restrictive terms "consisting of" and "consisting essentially of" and grammatical equivalents thereof.

As used herein, the term "may" with respect to a material, structure, feature, or method act indicates that such is contemplated for use in implementation of an embodiment of the disclosure, and such term is used in preference to the more restrictive term "is" so as to avoid any implication that other compatible materials, structures, features and methods usable in combination therewith should or must be excluded.

As used herein, the term "configured" refers to a size, shape, material composition, and arrangement of one or more of at least one structure and at least one apparatus facilitating operation of one or more of the structure and the apparatus in a predetermined way.

As used herein, the singular forms following "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" used in reference to a given parameter is inclusive of the stated value and has the meaning dictated by the context (e.g., it includes the degree of error associated with measurement of the given parameter).

As used herein, the term "earth-boring tool" means and includes any type of bit or tool used for drilling during the formation or enlargement of a wellbore and includes, for example, rotary drill bits, percussion bits, core bits, eccentric bits, bi-center bits, reamers, mills, drag bits, roller-cone bits, hybrid bits, and other drilling bits and tools known in the art.

Improvements in the thermal characteristics of cutting elements along with further improvements in cutting element efficiency and durability may be achieved in accordance with embodiments of the present disclosure. Downhole earth-boring tools, comprising cutting elements having novel geometries for improved thermal and mechanical efficiency, are described in further detail hereinbelow.

Figures 4A, 4B, 4C:
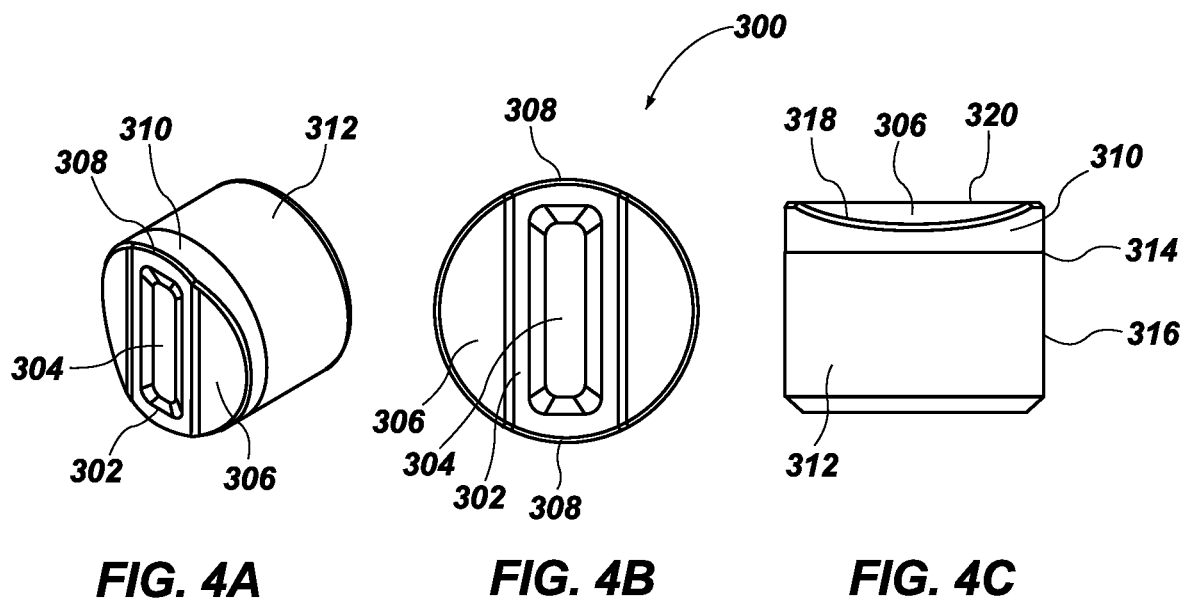
FIGS. 4A through 4C illustrate a PDC cutting element, in accordance with one embodiment, having a raised cutting surface comprising two cutting edges, a recess in the center of the raised cutting surface, and a non-raised planar transition surface.

FIGS. 4A, 4B, and 4C illustrate perspective, face and side views of an embodiment of a PDC cutting element 300 in accordance with the present disclosure. The PDC cutting element 300 comprises a raised cutting surface 302 having cutting edges 308, a recess 304, and transition surfaces 306. As illustrated in FIGS. 4A, 4B, and 4C, the raised cutting surface 302 is in the shape of a rectangle and has two cutting edges 308 proximate a side surface 316 of the cutting element 300. The optimal orientation for PDC cutting element 300 is to have the cutting edge 308 at the end of the rectangle of the raised cutting surface 302 oriented towards the formation material. When significant wear has worn down one side of the PDC cutting element 300, the PDC cutting element 300 may be rotated by removing the drill bit, and by removing, rotating, and reattaching the PDC cutting element 300 on the drill bit in order to orient the other cutting edge 308 towards the formation material to be drilled.

FIGS. 4A, 4B, and 4C also illustrate a chamfered edge 318 along the raised cutting surface 302 and between the side surface 316 and the transition surfaces 306 of the PDC cutting element 300. In some embodiments, the transition surfaces 306 extend from the raised cutting surface 302 to a side surface 316 of the PDC cutting element 300. In some embodiments, the transition surface 306 may be planar and may be parallel to a top face 320 of the raised cutting surface 302 of the PDC cutting element 300. In some embodiments, the transition surface 306 may be concave or convex. In some embodiments, the transition surface 306 may define a more complex shape. Similarly, in some embodiments, the recess 304 may be square, round, concave, convex, or still may define a more complex shape. In some embodiments, at least a portion of the recess 304 may be planar and may be in the same plane as the transition surface 306. The recess 304 may be formed such that it is deeper, the same depth, or less deep than transition surface 306. The raised cutting surface 302 may comprise between about 5% and 95% of the overall surface area of the PDC cutting element 300. The polycrystalline diamond material 310 is bonded to the substrate 312 at an interface 314.

Figures 5A, 5B, 5C:
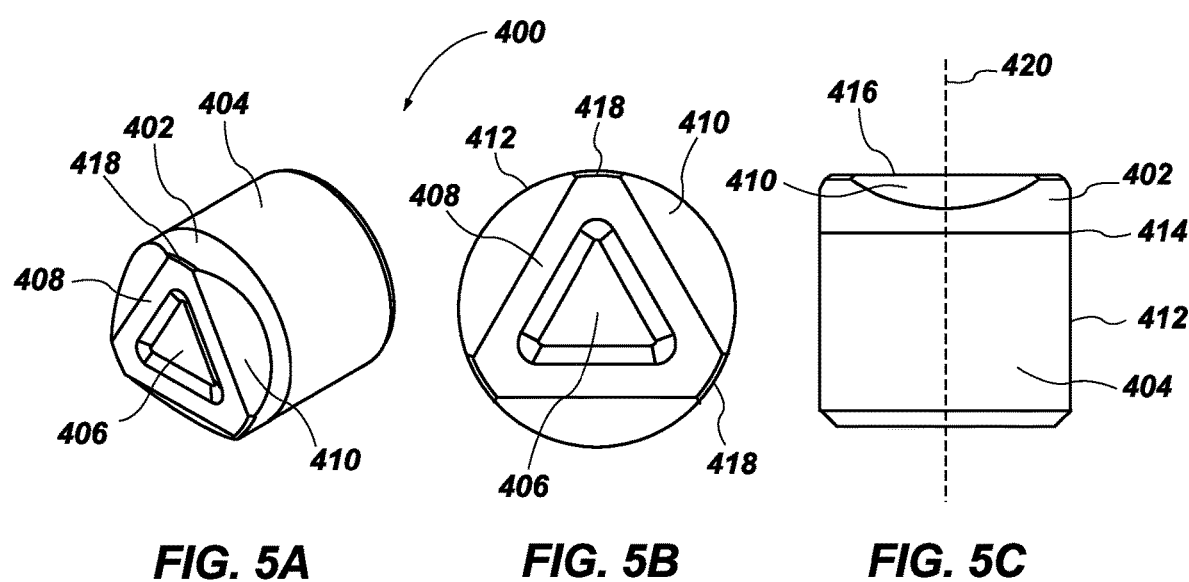
FIGS. 5A through 5C illustrate a PDC cutting element, in accordance with one embodiment, having a raised cutting surface comprising three cutting edges, a recess in the center of the raised cutting surface, and planar transition surfaces.

FIGS. 5A, 5B, and 5C illustrate perspective, face and side views of an embodiment of a PDC cutting element 400 in accordance with the present disclosure. In this embodiment, the PDC cutting element 400 has been configured to form a raised cutting surface 408 having three cutting edges 418, a recess 406 in the center of the raised cutting surface 408, and planar transition surfaces 410. The planar transition surfaces 410 extend from the raised cutting surface 408 to a longitudinal side surface 412 of the PDC cutting element. The polycrystalline diamond material 402 is bonded to the substrate 404 at an interface 414. In some embodiments, the raised cutting surface 408 may be perpendicular to a longitudinal axis 420 of the cutting element 400 and may be generally parallel to the interface 414 between the polycrystalline diamond material 402 and the substrate 404. Formation material will be cut by the cutting edges 418 of the raised cutting surface 408. Formation material may also be cut by the planar transition surfaces 410, and the edges where the planar transition surfaces 410 meet the longitudinal side surface 412 of the cutting element.

Tests have shown that the optimal orientation for PDC cutting element 400 is to have the apex (or point) of the triangular shape oriented (or pointed) towards the formation. The planar transition surfaces 410 may be configured to improve the flow of the formation cuttings and drilling fluid around the face of the cutting element 400. When significant wear has worn down one side of the PDC cutting element 400, the PDC cutting element 400 may be rotated by removing the drill bit, and by removing, rotating, and reattaching the PDC cutting element 400 on the drill bit in order to orient a second (and then a third) apex towards the formation material to be drilled.

The raised cutting surface 408 may extend to the longitudinal side surface 412 of the PDC cutting element 400 as illustrated in FIG. 5B or it may not extend all the way to the longitudinal side surface 412 of the PDC cutting element 400. In some embodiments the total thickness of the polycrystalline diamond material 402 may be between 1 mm and 10 mm, more preferably between 2 mm and 5 mm, more preferably about 3 mm to 3.5 mm.

The planar transition surfaces 410 and the recess 406 may be formed by grinding, milling, or laser machining the polycrystalline diamond material, or by any other suitable method known in the art. The top surface 416 of the raised cutting surface 408 may be planar and may be parallel to the interface 414 between the substrate 404 and the polycrystalline diamond material 402.

The planar transition surfaces 410 adjacent to the planar top surface 416 of the raised cutting surface 408 may form an angle between 1 and 90 degrees with respect to the planar top surface 416 of the raised cutting surface 408. In this embodiment, the cutting edges 418 of the raised cutting surface 408 are not chamfered, but as illustrated in FIGS. 4A-4C, 6A-6C, 8A-8C, and 9, the edges of the raised cutting surface 408 and the edges between the longitudinal side surface 412 of PDC cutting element 400 and the planar transition surfaces 410 may be chamfered. In this embodiment, the transition surfaces 410 between the cutting edge 418 of the raised cutting surface 408 and the longitudinal side surface 412 of the PDC cutting element 400 are planar.

However, the transition surfaces 410 may be concave (as illustrated in FIGS. 7A-7C and 8A-8C), convex, or the transition surfaces 410 may define a different and/or more complex shape.

The top surface 416 of the raised cutting surface 408 may comprise between about 5% and 95% of the overall surface area of the PDC cutting element 400. The cutting edges 418 of the raised cutting surface 408 may be linear (straight) as illustrated in FIGS. 4A-9, or they may form a portion of an arc. In some embodiments, the edges of the raised cutting surface 408 may define a more complex non-linear shape. The grinding, machining, milling or other processes used to remove material from the polycrystalline diamond material 402 may extend into as much as 95% of the thickness of the polycrystalline diamond material 402 to form the recess 406 and the planar transition surfaces 410, (and thus also forming (or exposing) the raised cutting surface 408).

The recess 406 inside the raised cutting surface 408 may conform to the shape of the exterior edges of the raised cutting surface 408. However, the recess 406 inside the raised cutting surface 408 may define a different shape and may be in the form of a circle, square, rectangle, or other shape. The depth of the recess 406 as compared to the depth of the machining outside the recess 406 may be deeper, the same depth, or not as deep. The edges of the recess 406 may form a 90 degree angle with respect to the top surface 416 of the PDC cutting element 400, or they may be at any angle between 1 and 90 degrees. At least a portion of the recess 406 (e.g., the bottom), may be planar and may also be parallel to the top surface 416 of the raised cutting surface 408 and/or to the interface 414 between the substrate 404 and the polycrystalline diamond material 402. In some embodiments, the bottom of the recess 406 may define a non-planar surface.

The recess 406 of the PDC cutting element 400 may improve cutting performance in at least two ways: First, the recess 406 may aid in breaking up the formation material after it has been cut away. As described above, the PDC cutting element 400 shears the formation material with a cutting action like that of a lathe. Thus, a cutting from the formation material may be in the form of a long ribbon that can make disposal of the cutting more difficult and can lead to bit balling and flow problems. Testing has shown that the recess 406 aids in breaking up the formation material into smaller chunks rather than a long ribbon, thus improving the cutting efficiency of the PDC cutting element 400. Improved cutting action with better flow around the PDC cutting element 400 will improve the efficiency of the drill bit and may allow operation of the drill bit using less force (axial and tangential) to maintain a specified Rate Of Penetration (ROP). This would result in less torque to rotate the drill bit and less weight on the bit.

Second, tests indicate that the recess 406 aids in keeping the polycrystalline diamond material 402 of the PDC cutting element 400 cooler during operation. This may be because the recess 406 adds surface area which improves heat transfer from the top surface 416 of the PDC cutting element 400 to the drilling fluid. Tests have demonstrated 25% better cooling of the PDC cutting element 400 which allows for increased cutting with better performance properties and less diamond-to-diamond bond degradation or thermal damage to the polycrystalline diamond material 402.

Figures 6A, 6B, 6C:
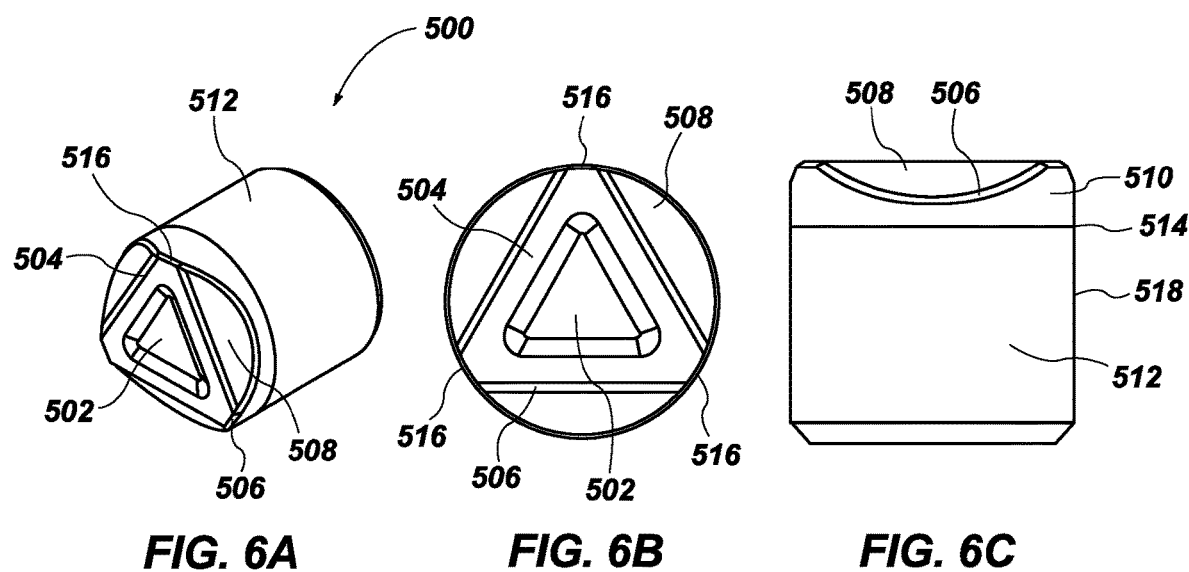
FIGS. 6A through 6C illustrate a PDC cutting element, in accordance with one embodiment, having a raised cutting surface comprising three cutting edges, a recess in the center of the raised cutting surface, and planar transition surfaces; wherein at least one of the cutting edges is chamfered.

FIGS. 6A, 6B, and 6C illustrate perspective, face and side views of an embodiment of a PDC cutting element 500 in accordance with the present disclosure. In this embodiment, the PDC cutting element 500 has been configured to form a raised cutting surface 504 having three cutting edges 516, a recess 502 in the center of the raised cutting surface 504, and planar transition surfaces 508. The planar transition surfaces 508 extend from the cutting edges 516 of the raised cutting surface 504 to a side surface 518 of the PDC cutting element 500. The polycrystalline diamond material 510 is bonded to the substrate 512 at an interface 514. FIGS. 6A, 6B, and 6C also illustrate a chamfered edge 506 along the raised cutting surface 504 and between the side surface 518 and the planar transition surfaces 508 of the PDC cutting element 500. As described above, a chamfered edge 506 has been found to reduce the tendency of the polycrystalline diamond material 510 to spall and fracture.

Figures 7A, 7B, 7C:
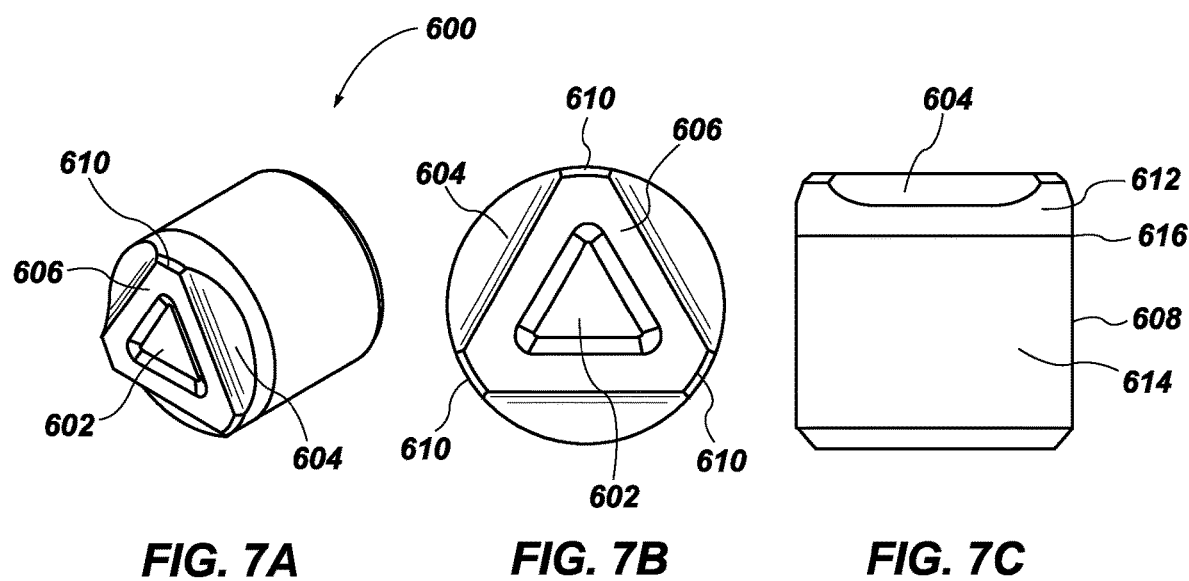
FIGS. 7A through 7C illustrate a PDC cutting element, in accordance with one embodiment, having a raised cutting surface comprising three cutting edges, a recess in the center of the raised cutting surface, and concave transition surfaces.

FIGS. 7A, 7B, and 7C illustrate perspective, face and side views of an embodiment of a PDC cutting element 600 in accordance with the present disclosure. In this embodiment, the PDC cutting element 600 has been configured to form a raised cutting surface 606 having three cutting edges 610, a recess 602, and concave transition surfaces 604. The concave transition surfaces 604 extend from the cutting edges 610 to a side surface 608 of the PDC cutting element 600. The polycrystalline diamond material 612 is bonded to the substrate 614 at an interface 616. The concave transition surfaces 604, similar to the planar transition surfaces 410 and 505, illustrated in FIGS. 5A-5C and 6A-6C, respectively, improve the flow of fluid around the PDC cutting element 600 and increase the efficiency and durability of the PDC cutting element 600.

FIGS. 8A, 8B, and 8C illustrate perspective, face and side views of an embodiment of a PDC cutting element 700 in accordance with the present disclosure. In this embodiment, the PDC cutting element 700 has been configured to form a raised cutting surface 708 having three cutting edges 714, a recess 702, and concave transition surfaces 706. The concave transition surfaces 706 extend from the cutting edges 714 to a side surface 710 of the PDC cutting element 700. The polycrystalline diamond material 712 is bonded to the substrate 716 at an interface 718. FIGS. 8A, 8B, and 8C also illustrate a chamfered edge 704 along the edge of the raised cutting surface 708 and between the concave transition surfaces 706 and the side surface 710 of the PDC cutting element 700. As described above, a chamfered edge 704 has been found to reduce the tendency of the polycrystalline diamond material 712 to spall and fracture.

Figure 9:
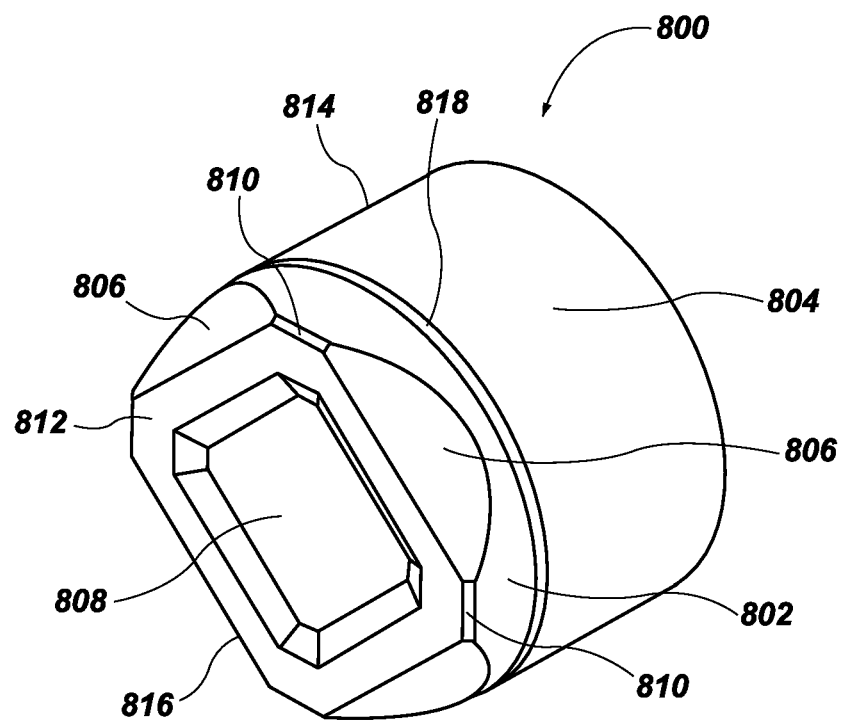
FIG. 9 illustrates a PDC cutting element, in accordance with one embodiment, having a raised cutting surface in the shape of a square, comprising at least four cutting edges a recess in the center of the raised cutting surface, concave transition surfaces, and chamfered cutting edges.

FIG. 9 illustrates an embodiment of a PDC cutting element 800 in accordance with the present disclosure. In this embodiment, the PDC cutting element has been configured to form a raised cutting surface 812 having four cutting edges 810, a recess 808, and planar transition surfaces 806. In this embodiment, the raised cutting surface 812 forms the shape of a square. Similar to the triangular shaped raised cutting surfaces described above, it is expected that the highest cutting rates will be achieved when the cutting edge 810 at the corner of the square of the raised cutting surface 812 is oriented towards the formation material. As shown FIG. 9, the planar raised cutting surface 812 has a generally octagonal shape having four longer sides and wherein the four outer corners (cuttings edges 810) of the planar raised cutting surface comprise four additional shorter sides of the planar raised cutting surface.

FIG. 9 also illustrates a chamfered edge 816 along the cutting edges 810 of the raised cutting surface 812 and between the side surface 814 and the planar transition surfaces 806 of the PDC cutting element 800. The polycrystalline diamond material 802 is bonded to the substrate 804 at an interface 818. The planar transition surfaces 806 extend from the raised cutting surface 812 to a side surface 814 of the PDC cutting element 800.

Figure 10:
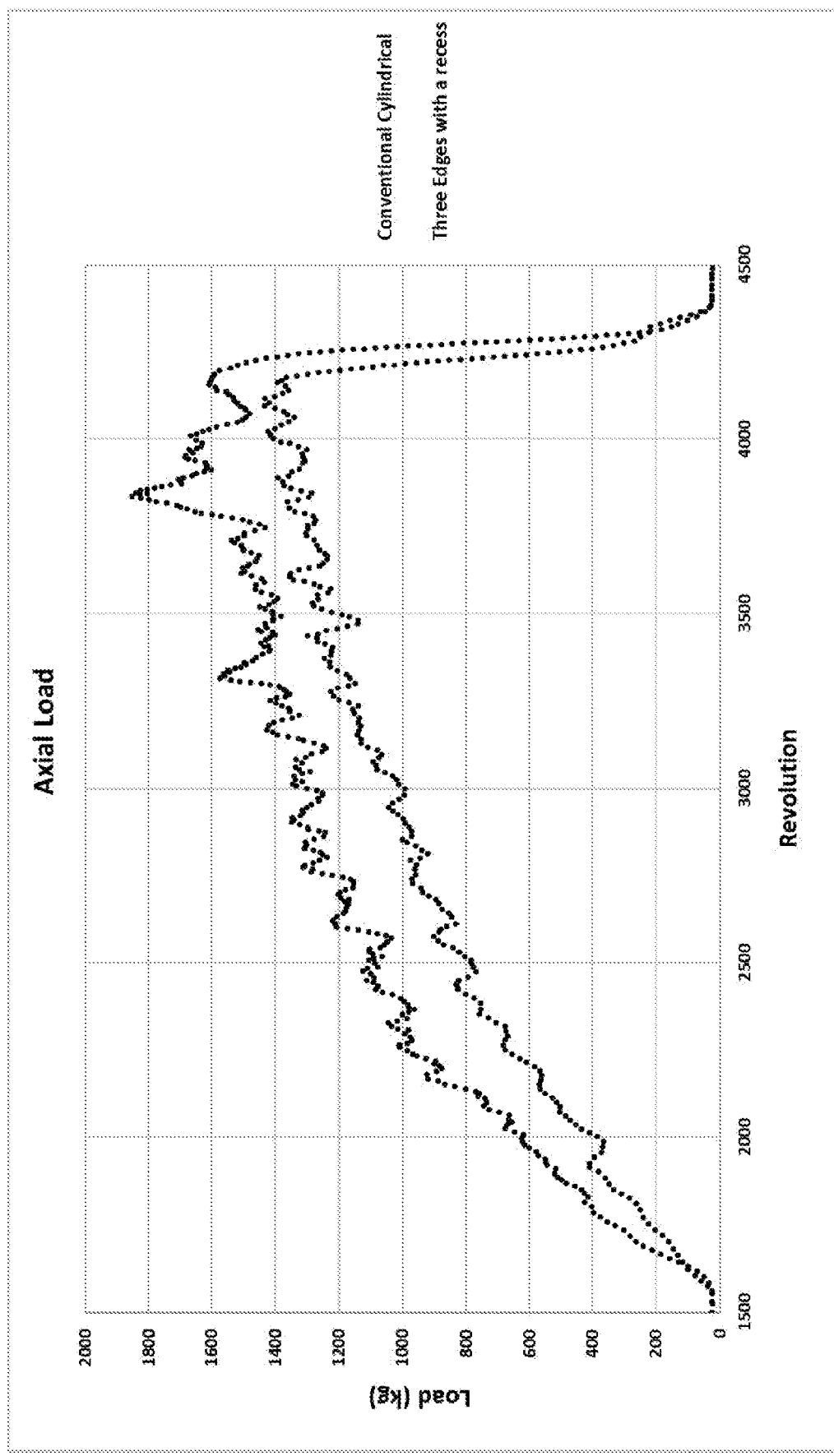
FIG. 10 is a graph depicting axial load over time on a prior art conventional cylindrical cutting element and a cutting element, in accordance with one embodiment, having a raised cutting surface comprising three cutting edges and a recess in the center of the raised cutting surface.

FIG. 10 is a graph of axial load on a cutting element over time. Axial load is the force applied to a cutting element that is required for the cutting element to cut into the formation material. This could also be referred to as Weight On Bit (WOB), because in operation, a cutting element will be attached to a spinning drill bit and axial load is a measure of the amount of axial force (weight on bit) needed to allow the drill bit to engage the formation material.

The plot lines in FIG. 10 each represent one individual cutting element as it is being tested interacting with formation material. Axial load is plotted on the Y axis in units of kilograms while the X axis represents time and each dot represents a measurement (or series of measurements) at a specific time. A prior art conventional cylindrical cutting element is represented by the lighter gray dots. An embodiment of the invention, namely, an improved geometry three edge cutting element is represented with the darker black dots.

The increase over time of the two lines of FIG. 10 indicates that greater axial load (or force) is required for each cutting element to maintain a given penetration rate over time. Greater force on the cutting elements is required as the cutting elements abrade and get worn (dull) over time. As can be seen in FIG. 10, the prior art conventional cylindrical cutting element consistently requires about 200-250 more kg of axial load than does the improved geometry three edge cutting element. More force required to move the cutting element means more WOB. It also means more abrasion on the cutting element and a shorter lifetime for the cutting element. Moreover, more force also means more heat generated at the cutting element which (as described above) may cause thermal damage to the cutting element and to the polycrystalline diamond material.

Figure 11:
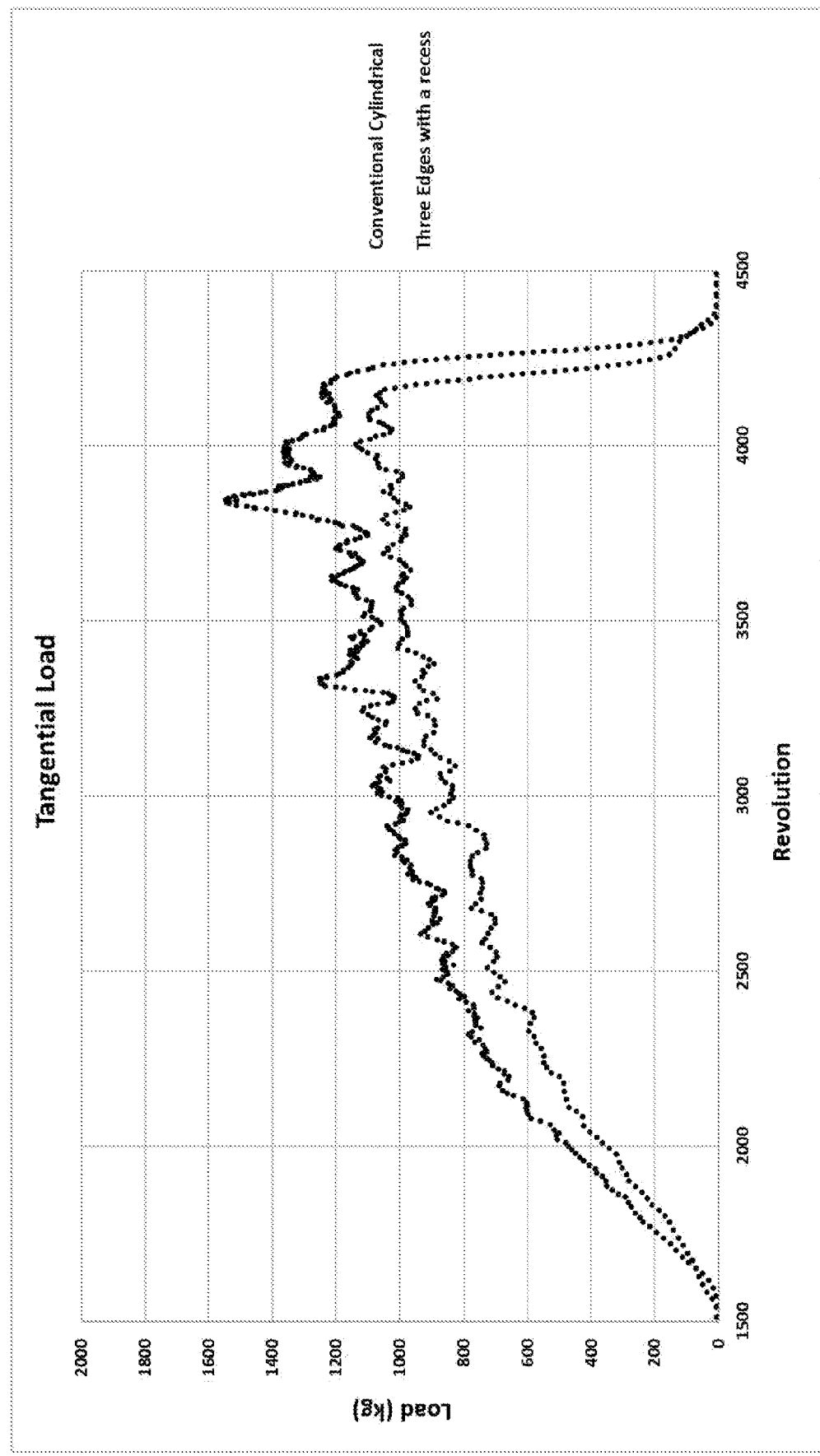

FIG. 11 is a graph of tangential load on a cutting element over time. Tangential load is the sideways force imposed on a cutting element as it engages the formation material. Tangential load represents the torque necessary to spin the drill bit to maintain a given ROP in the formation material.

Similar to the graph of FIG. 10, FIG. 11 illustrates that the prior art conventional cylindrical cutting element requires about 90 to 140 more kg of force (torque) than does the improved geometry three edge cutting element. As described above, higher torque (force) requirements mean, hotter operating temperatures, more abrasion, and shorter lifetimes for the cutting elements and the drill bit.

FIG. 12A illustrates a wear scar 1106 for a prior art conventional cylindrical cutting element 1102 having a cutting edge 1104. FIG. 12B illustrates a wear scar 1114 for a prior art cutting element 1108 having planar tapered surfaces 1110 and a cutting edge 1112. FIG. 12C illustrates a wear scar 1126 for a cutting element 1116 having a raised cutting surface 1118, a recess 1122, and planar transition surfaces 1124. In this embodiment, the raised cutting surface 1118 has three cutting edges 1120. FIG. 12D illustrates a wear scar 1138 for a cutting element 1128 having a raised cutting surface 1130, a recess 1134, and arcuate transition surfaces 1136. In this embodiment, the raised cutting surface 1130 has three cutting edges 1132. As demonstrated in the chart below, close inspection reveals that the wear scar area is smaller for FIGS. 12B, 12C, and 12D) than it is for FIG. 12A.

Chart of wear state comparison for four cutting elements.

Planar

| Wear State | Dimension A | Dimension B | Dimension C | Wear Scar Area (in^2) |
|---|---|---|---|---|
| Planar | | | | |
| 0.5 | 0.033 | 0.405 | 0.212 | 0.021 |
| 1 | 0.066 | 0.289 | 0.319 | 0.057 |
| 1.5 | 0.099 | 0.174 | 0.387 | 0.103 |
| 3-Edged Flats | | | | |
| 0.5 | 0.033 | 0.405 | 0.112 | 0.018 |
| 1 | 0.066 | 0.289 | 0.15 | 0.052 |
| 1.5 | 0.099 | 0.174 | 0.188 | 0.096 |
| Scribe | | | | |
| 0.5 | 0.033 | 0.385 | 0.192 | 0.018 |
| 1 | 0.066 | 0.269 | 0.258 | 0.049 |
| 1.5 | 0.099 | 0.154 | 0.324 | 0.091 |
| 3-Edged Concave | | | | |
| 0.5 | 0.031 | 0.405 | 0.065 | 0.015 |
| 1 | 0.063 | 0.291 | 0.075 | 0.047 |
| 1.5 | 0.095 | 0.175 | 0.09 | 0.096 |

The chart above compares the wear states of the four cutting elements described above. Wear state 0.5 means that one-sixteenth of the cutting element edge is worn down. Wear state 1 means one-eighth of the cutting element edge is worn down and 1.5 means that three-sixteenths of the cutting element edge is worn down. FIGS. 12A, 12B, 12C, and 12D illustrate the cutting elements in the "1" (or one-eighth) state. As illustrated in FIG. 12A, and demonstrated in the chart, the prior art conventional cylindrical element had a larger "wear scar" area than any of the modified cutting elements. The three-edge concave cutting element, illustrated in FIG. 12D, had the smallest wear scar area for two of the three measurement states.

The graphs in FIGS. 10-12D and the chart above demonstrate that an embodiment, the modified raised cutting surface, requires less torque, less weight on the bit (WOB), and forms a smaller wear scar area than the prior art conventional cylindrical bit. Therefore, the graphs and chart demonstrate that the modified raised cutting surface may last longer and be more durable than the prior art conventional cylindrical bit.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

In exemplary embodiments, a typical rotary-type "drag" bit made from steel and using PDC cutting elements is described. Those skilled in the art, however, will appreciate that the size, shape, and/or configuration of the bit may vary according to operational design parameters without departing from the spirit of the present invention. Further, the invention may be practiced on non-rotary drill bits, the invention having applicability to any drilling-related structure including percussion, impact or "hammer" bits. It will also be appreciated by one of ordinary skill in the art that one or more features of any of the illustrated embodiments may be combined with one or more features from another embodiment to form yet another combination within the scope of the invention as described and claimed herein. Thus, while certain representative embodiments and details have been shown for purposes of illustrating the invention, it will be apparent to those skilled in the art that various changes in the invention disclosed herein may be made without departing from the scope of the invention, which is defined in the appended claims.

Additional non-limiting example embodiments of the disclosure are described below.

Embodiment 1: A cutting element comprising a substrate and a polycrystalline diamond material affixed to the substrate at an interface. The polycrystalline diamond material comprising a raised cutting surface comprising at least two cutting edges, a recess in a center of the raised cutting surface-; and a transition surface between the at least two cutting edges of the raised cutting surface and a longitudinal side surface of the cutting element.

Embodiment 2: The cutting element of Embodiment 1, wherein the raised cutting surface covers between 10% and 90% of a total surface area of a cutting face of the cutting element.

Embodiment 3: The cutting element of Embodiment 1 or Embodiment 2, wherein at least one edge of the raised cutting surface comprises a chamfered edge.

Embodiment 4: The cutting element of any of Embodiments 1 through 3, wherein at least a portion of the raised cutting surface extends to the longitudinal side surface of the cutting element.

Embodiment 5: The cutting element of any of Embodiments 1 through 4, wherein the transition surface has a concave surface profile.

Embodiment 6: The cutting element of any of Embodiments 1 through 5, wherein the cutting edges defining the raised cutting surface have a rectangular shape.

Embodiment 7: The cutting element of any of Embodiments 1 through 5, wherein the raised cutting surface comprises at least three cutting edges.

Embodiment 8: The cutting element of any of Embodiments 1 through 7, wherein the cutting edges defining the raised cutting surface have a triangular shape.

Embodiment 9: cutting element of any of Embodiments 1 through 8, wherein an apex of the triangular shape is oriented towards formation material.

Embodiment 10: The cutting element of any of Embodiments 1 through 9, wherein the raised cutting surface comprises at least four cutting edges.

Embodiment 11: An earth-boring downhole tool comprising a bit body; a plurality of blades extending from one end of the body, each blade comprising a leading edge section; and at least one cutting element disposed within each blade proximate the leading edge section of the blade. The at least one cutting element comprising a substrate and a polycrystalline diamond material affixed to the substrate at an interface. The polycrystalline diamond material comprising, a raised cutting surface comprising at least three cutting edges, a recess in a center of the raised cutting surface, and a transition surface between the at least three cutting edges of the raised cutting surface and a longitudinal side surface of the cutting element.

Embodiment 12: The earth-boring downhole tool of Embodiment 11, wherein the transition surface is planar.

Embodiment 13: The earth-boring downhole tool of Embodiment 11 or Embodiment 12, wherein the planar transition surface is perpendicular to a longitudinal axis of the cutting element.

Embodiment 14: The earth-boring downhole tool of any of Embodiments 11 through 13, wherein the raised cutting surface is parallel with the planar transition surface.

Embodiment 15: The earth-boring downhole tool of any of Embodiments 11 through 14, wherein the raised cutting surface and the planar transition surface are parallel to the interface between the substrate and the polycrystalline diamond material.

Embodiment 16: The earth-boring downhole tool of any of Embodiments 11 through 15, wherein at least a portion of a surface of the recess is parallel to the raised cutting surface and the transition surface.

Embodiment 17: The earth-boring downhole tool of any of Embodiments 11 through 16, wherein the transition surface and the at least a portion of the recess that are parallel to each other are at a same height.

Embodiment 18: A method of manufacturing an earth-boring downhole tool comprising: forming a drill bit body; forming at least one blade extending from one end of the drill bit body, the at least one blade comprising a leading edge section, and forming at least one cutting element in each at least one blade proximate the leading edge section of the at least one blade. Wherein forming the at least one cutting element comprises forming a polycrystalline diamond material, affixing a first end of the polycrystalline diamond material at an interface to a substrate, and shaping a second end of the polycrystalline diamond material. Wherein shaping the second end of the polycrystalline diamond material comprises forming at least two cutting edges defining a raised cutting surface, forming at least one recess in a center of the raised cutting surface, and forming at least one transition surface between at least one of the at least two cutting edges defining the raised cutting surface and a longitudinal side surface of the cutting element.

Embodiment 19: The method of Embodiment 18, further comprising forming at least a portion of the raised cutting surface, the recess, and the transition surface by laser machining.

Embodiment 20: The method of Embodiment 18 or Embodiment 19, further comprising forming at least a portion of the raised cutting surface, the recess, and the transition surface by grinding.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:
1. A cutting element, comprising:
   a substrate; and
   a polycrystalline diamond material affixed to the substrate at an interface, the polycrystalline diamond material comprising:

a planar raised cutting surface comprising four inner corners and four outer corners and at least four cutting edges;

a rectangular planar surface in a central region of the polycrystalline diamond material, the rectangular planar surface recessed relative to the planar raised cutting surface, the rectangular planar surface being surrounded by the planar raised cutting surface; and a transition surface extending between two of the at least four cutting edges of the planar raised cutting surface and a longitudinal side surface of the cutting element;

wherein the at least four cutting edges are located on the four outer corners of the planar raised cutting surface, and wherein the at least four cutting edges defining the planar raised cutting surface have a rectangular shape.

2. The cutting element of claim 1, wherein the planar raised cutting surface covers between 10% and 90% of a total surface area of a cutting face of the cutting element.

3. The cutting element of claim 1, wherein at least one edge of the at least four cutting edges comprises a chamfered edge.

4. The cutting element of claim 1, wherein at least a portion of the planar raised cutting surface extends to the longitudinal side surface of the cutting element.

5. The cutting element of claim 1, wherein the transition surface has a concave surface profile.

6. The cutting element of claim 1, wherein the at least four cutting edges defining the planar raised cutting surface have a square shape.

7. An earth-boring downhole tool, comprising:
a bit body;
a plurality of blades extending from one end of the bit body, each blade comprising a leading edge section; and
at least one cutting element disposed within each blade proximate the leading edge section of the blade, the at least one cutting element comprising:
a substrate; and
a polycrystalline diamond material affixed to the substrate at an interface, the polycrystalline diamond material comprising:
a planar raised cutting surface comprising four inner corners and four outer corners and at least four cutting edges;
a rectangular planar surface in a central region of the polycrystalline diamond material, the rectangular planar surface recessed relative to the planar raised cutting surface, the rectangular planar surface being surrounded by the planar raised cutting surface; and
a transition surface extending between two of the at least four cutting edges of the planar raised cutting surface and a longitudinal side surface of the at least one cutting element;
the planar raised cutting surface defining a generally octagonal shape having four longer sides and wherein the four outer corners of the planar raised cutting surface comprise four additional shorter sides of the planar raised cutting surface;
wherein the at least four cutting edges are located on the four outer corners of the planar raised cutting surface.

8. The earth-boring downhole tool of claim 7, wherein the transition surface is planar.

9. The earth-boring downhole tool of claim 8, wherein the planar transition surface is perpendicular to a longitudinal axis of the at least one cutting element.

10. The earth-boring downhole tool of claim 9, wherein the planar raised cutting surface is parallel with the planar transition surface.

11. The earth-boring downhole tool of claim 10, wherein the planar raised cutting surface and the planar transition surface are parallel to the interface between the substrate and the polycrystalline diamond material.

12. The earth-boring downhole tool of claim 11, wherein at least a portion of a surface of the recess is parallel to the planar raised cutting surface and the transition surface.

13. The earth-boring downhole tool of claim 12, wherein the transition surface and the at least a portion of the recess that are parallel to each other are at a same height.

14. A method of manufacturing an earth-boring downhole tool, comprising:
forming a drill bit body;
forming at least one blade extending from one end of the drill bit body, the at least one blade comprising a leading-edge section; and
forming at least one cutting element in each at least one blade proximate the leading-edge section of the at least one blade;
wherein forming the at least one cutting element comprises:
forming a polycrystalline diamond material;
affixing a first end of the polycrystalline diamond material at an interface to a substrate; and
shaping a second end of the polycrystalline diamond material;
wherein shaping the second end of the polycrystalline diamond material comprises:
forming at least four cutting edges defining a planar raised cutting surface;
forming a rectangular planar surface in a central region of the polycrystalline diamond material, the rectangular planar surface recessed relative to the planar raised cutting surface, the rectangular planar surface being surrounded by the planar raised cutting surface, the rectangular planar surface comprising four inner corners and four outer corners; and
forming at least one transition surface between at least two of the at least four cutting edges defining the planar raised cutting surface and a longitudinal side surface of the cutting element;
wherein the at least four cutting edges are formed on the four outer corners of the planar raised cutting surface; and
wherein the at least four cutting edges defining the planar raised cutting surface have a rectangular shape.

15. The method of claim 14, further comprising forming at least a portion of the planar raised cutting surface, the recess, and the transition surface by laser machining.

16. The method of claim 14, further comprising forming at least a portion of the planar raised cutting surface, the recess, and the transition surface by grinding.

* * * * *